I. A. Towers,
Cotton Planter.
No. 110,311. Patented Dec. 20, 1870.
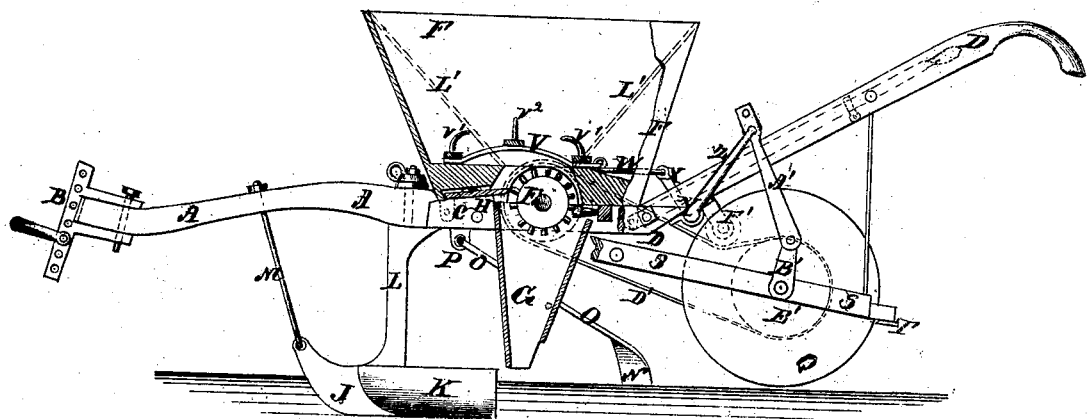
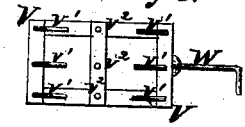
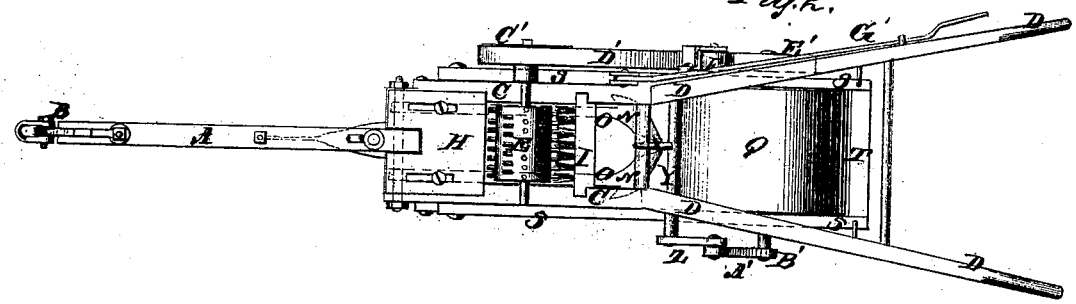
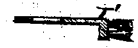 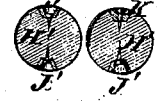
Witnesses:
John N. Becker
D. S. Mabu
Inventor:
I. A. Towers
per Munn & Co
Attorneys

United States Patent Office.

ISAAC A. TOWERS, OF QUINCY, FLORIDA.

Letters Patent No. 110,311, dated December 20, 1870.

IMPROVEMENT IN COTTON-SEED AND CORN-PLANTERS.

The Schedule referred to in these Letters Patent and making part of the same.

*To all whom it may concern:*

Be it known that I, ISAAC A. TOWERS, of Quincy, in the county of Gadsden and State of Florida, have invented a new and useful Improvement in Combined Cotton-seed and Corn-Planter; and I do hereby declare that the following is a full, clear, and exact description thereof, which will enable others skilled in the art to make and use the same, reference being had to the accompanying drawing forming part of this specification.

Figure 1 is a side view of my improved machine, partly in section, to show the construction.

Figure 2 is a top view of the same, the hopper and stirrer being removed.

Figure 3 is a detail-plan view of the stirrer or rake.

Figure 4 is a section of the detachable brush.

Figures 5 and 6 are detail sectional views of the cylinder for dropping corn and other smooth seed.

Similar letters of reference indicate corresponding parts.

My invention has for its object to furnish an improved planter which shall be simple in construction and effective in operation, and which may be readily adjusted for planting the linty seeds of short staple cotton, or for planting black cotton-seed, corn, peas, or other smooth seeds; and It consists in the construction and combination of the various parts of the machine, as hereinafter more fully described.

A is the beam, to the forward end of which the draft is attached.

B is the draft-iron, which is attached to the forward end of the beam somewhat in the manner of an ordinary clevis, and the front or vertical bar of which extends above and below the beam, and has a number of holes formed in it for the attachment of the clevis, so that the depth at which the seeds are planted in the ground may be regulated by adjusting the point of draft attachment.

The rear end of the beam A is attached to the forward end of the frame C, to the rear ends of which the handles D are attached.

E is the cylinder for dropping the seeds of short-staple cotton, and which is armed with numerous spikes or teeth, which take hold of the cotton-seeds and draw them out of the hopper F and drop them into the spout G, by which they are conducted to the ground.

H is a knife or plate, the forward edge of which is beveled off upon its lower side, and which is secured to the frame C by screws or bolts which pass through slots in the said knife or plate H, and into or through the said frame C, so that the said knife or plate may be moved closer to or further from the dropping-cylinder E, accordingly as it is desired to have more or less seed pass out at a time.

The knife or plate H is attached to the upper side of the frame C, in front of the dropping-cylinder E, and to the under side of said frame C, at the rear side of the said cylinder E, is attached a stationary brush, I, to clean the spikes or teeth of said cylinder from any lint that might adhere to them and impede their operation.

J is the cutter or knife that splits the soil and opens the way for the boat-shaped shoe K, which presses back the soil and forms a V-shaped furrow to receive the seed, leaving the sides of said furrow smooth, so that the seed will slide down to the bottom of the furrow.

The forward part of the cutter or knife J is curved upward in the manner of a sleigh-runner, and its edge is made sharp, so that it may be readily forced through the ground and may cut off roots or other obstructions that may be in its way.

The standard L of the cutter or knife J is secured to the beam A, and the draft-strain upon it is sustained by the brace-rod M, the lower end of which is secured to the forward part of the cutter or knife J, and the upper end of which is secured to the beam A, as shown in fig. 1.

As the seed drops into the ground it is covered by the coverers N, which are so formed as to move the soil forward and inward, filling up the furrow.

The coverers N are formed upon or attached to the rear ends of the rods O, the forward ends of which are rigidly attached to the short shaft P, which revolves in bearings attached to the under side of the forward part of the frame C. By this construction and arrangement the coverers will be held down by their own weight, their peculiar form causing them to take hold of the soil as the machine is drawn forward.

The soil is pressed down upon the seed by the ground-roller Q, the journals of which revolve in bearings attached to the arms or bars S, the forward ends of which are attached to the sides of the frame C, and to the rear ends of which is attached a plate or bar, T, in such a position as to scrape off any soil that may adhere to the roller Q.

F is the hopper, which is securely but detachably attached to the frame C, and the bottom of which has an opening formed through it, into which the upper side of the spiked or toothed cylinder E projects, so that the said spikes or teeth may take hold of the cotton-seeds and draw them out of the said hopper.

The cotton-seed in the lower part of the hopper E is kept stirred up so that it may pass down freely and constantly to the toothed cylinder E by the curved or arched stirrer V, to the front and rear cross-bars of which are attached curved or hooked teeth or fingers $v^1$, and to the central cross-bars of which are attached straight fingers or teeth $v^2$, so that, by the movement of the stirrer, the seed may be stirred, and, at the same time, fed or drawn down toward the dropping-cylinder E.

To the rear end of the stirrer or rake V is pivoted the forward end of a short connecting-rod, W, which passes out through the rear end of the hopper F, and has a hook formed upon its rear end, which hooks into an eye formed in the end of the upright arm X, rigidly attached to and formed solidly upon the shaft Y, which revolves in bearings attached to the handles D, bars S, or frame C, as may be most convenient.

To one end of the shaft Y is rigidly attached or upon it is formed an arm Z, about at right angles with the arm X, and to the outer end of which is adjustably pivoted the upper end of the connecting-bar A', so that the stroke of the stirrer V may be lengthened or shortened as may be required.

The lower end of the connecting-bar A' is pivoted to the crank B', attached to the projecting end of one of the journals of the ground-roller Q, so that the stirrer V may be operated by the advance of the machine.

To the projecting end of one of the journals of the dropping-cylinder E is attached a pulley, C', around which passes a band, D', which also passes around a pulley, E', attached to the projecting ends of one of the journals of the ground-roller Q, so that the dropping-cylinder E may be operated by the advance of the machine.

The rapidity of the feed is regulated by varying the size of the pulley C', a larger pulley C' giving a slower and a smaller pulley a faster feed.

F' is an idler, which is pivoted to a support attached to or formed upon the lever G', the lower end of which is pivoted to the frame C or bar S, and which extends up along the handle D into such a position that it may be conveniently reached and operated by the driver, so that, by pressing the idler F' down upon the belt D', the advance of the machine may revolve the dropping-cylinder, and, by raising the idler from the belt D', said belt will be slackened so as not to revolve the said dropping-cylinder.

The lever G' is held in place, when pressing the idler F' down upon the belt D' by a catch attached to the handle D. By this construction, by raising the idler F' and disconnecting the stirrer V from the rock-shaft Y, the machine may be taken from place to place, even when the hopper is full of seed, without dropping any of the said seed.

To adjust the machine for planting corn, peas, black cotton-seed, and other smooth seeds, the stirrer V and hopper F are removed, the toothed cylinder replaced with the recessed cylinder H', the plate or knife H is replaced by the brush I, and the hopper again placed in position.

The cylinder H' is formed with recesses upon its opposite sides, into which are fitted small cups, J', which are secured in place by small screws passing through holes in the bottom of said cups and screwing into the cylinder H'.

The amount of seed dropped at a time is regulated by using cups J' with larger or smaller cavities, and the distance apart of the hills may be regulated by varying the size of the pulleys C' attached to the journal of the dropping-cylinder H', or by inserting a blank, K', in one of the recesses of the cylinder H'.

When the machine is used for planting smooth seeds, inclined end-boards L' are inserted in the hopper F, with their upper ends resting against the upper parts of the end boards of the said hopper.

The lower end of the rear board L' is so formed as to enter the opening in the bottom of the hopper, and fit sufficiently close to the dropping-cylinder H' to prevent the escape of the seed.

The lower edge of the forward board L' rests upon the bottom of the hopper, close to the opening through said bottom, allowing the seed to come freely into contact with the cylinder H', the detachable brush I' preventing any more seed being carried out by said cylinder than enough to fill the cups J'.

Having thus described my invention,

I claim as new and desire to secure by Letters Patent—

1. The cutter J and shoe K, combined and arranged with the dropping device, as shown and described.

2. The rake or stirrer V, in combination with the hopper F and spiked or toothed dropping-cylinder E, and connected with the ground-roller Q by the connecting-rod W, two-armed shaft X Y Z, connecting-rod A', and crank B', substantially as herein shown and described, and for the purpose set forth.

3. The pivoted coverers N O P, constructed, arranged, and operating in connection with the furrow-opener J K, roller Q, and seed-dropping device of a planter, substantially as herein shown and described, and for the purpose set forth.

4. The combination of the roller F' and lever G' with the belt D' and pulleys C' E', attached to the ground-roller Q, and the dropping-cylinder of a planter, substantially as herein shown and described, and for the purpose set forth.

5. The combination of the adjustable plate H with the spiked or toothed cylinder E, frame C, and bottom of the hopper F, substantially as herein shown and described, and for the purpose set forth.

6. The stationary brush I, secured to the frame C in the rear of the toothed or spiked cylinder E, substantially as herein shown and described, and for the purpose set forth.

7. The combination of the beam A, draft-iron B, frame C, handles D, bars S, hopper F, toothed cylinder E, pulley C', belt D', pulley E', grooved roller Q, crank B', connecting-rod A', two-armed shaft X Y Z, connecting-rod W, rake or stirrer V, adjustable plate H, and stationary brush I, conductor-spout G, furrow-opener J K, and pivoted coverer N O P, with each other, substantially as herein shown and described, and for the purpose set forth.

ISAAC A. TOWERS.

Witnesses:
R. F. JONES,
EDWD. OWENS.